US011995821B2

(12) United States Patent
Jiang et al.

(10) Patent No.: US 11,995,821 B2
(45) Date of Patent: May 28, 2024

(54) MEDICAL IMAGE REGION SCREENING METHOD AND APPARATUS AND STORAGE MEDIUM

(71) Applicant: TENCENT TECHNOLOGY (SHENZHEN) COMPANY LIMITED, Shenzhen (CN)

(72) Inventors: Cheng Jiang, Shenzhen (CN); Kuan Tian, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 451 days.

(21) Appl. No.: 17/367,316

(22) Filed: Jul. 2, 2021

(65) Prior Publication Data

US 2021/0343021 A1 Nov. 4, 2021

Related U.S. Application Data

(63) Continuation of application No. PCT/CN2020/074782, filed on Feb. 12, 2020.

(30) Foreign Application Priority Data

Feb. 14, 2019 (CN) .......................... 201910115522.9

(51) Int. Cl.
  *G06T 7/00* (2017.01)
  *G06T 5/73* (2024.01)
  (Continued)

(52) U.S. Cl.
  CPC .............. *G06T 7/0012* (2013.01); *G06T 5/73* (2024.01); *G06T 7/11* (2017.01); *G06V 10/25* (2022.01);
  (Continued)

(58) Field of Classification Search
  CPC ......... G06T 7/0012; G06T 7/11; G06T 5/003; G06T 2207/20076; G06T 2207/20081;
  (Continued)

(56) References Cited

U.S. PATENT DOCUMENTS 8,064,677 B2 * 11/2011 Nie ........................... G06T 7/62
                                                                 382/132
9,532,762 B2    1/2017 Cho et al.
(Continued)

FOREIGN PATENT DOCUMENTS

CN    101061513 A    10/2007
CN    101401730 A     4/2009
(Continued)

OTHER PUBLICATIONS

The World Intellectual Property Organization (WIPO) International Search Report for PCT/CN2020/074782 dated May 9, 2020 6 Pages (including translation).

(Continued)

*Primary Examiner* — John B Strege
(74) *Attorney, Agent, or Firm* — ANOVA LAW GROUP, PLLC

(57) ABSTRACT

A medical image region screening method and apparatus and a storage medium are provided. The method includes: obtaining a medical image of biological tissue, segmenting tissue regions of a plurality of tissue types from the medical image, selecting, from the tissue regions of the plurality of tissue types based on types of capturing positions of the medical image, a reserved region, obtaining a positional relationship between the reserved region and a predicted lesion region in the medical image; and screening for the predicted lesion region in the medical image based on the positional relationship, to obtain a target lesion region.

17 Claims, 9 Drawing Sheets

(51) Int. Cl.
*G06T 7/11* (2017.01)
*G06V 10/25* (2022.01)

(52) U.S. Cl.
CPC ............. *G06T 2207/20076* (2013.01); *G06T 2207/20081* (2013.01); *G06T 2207/20084* (2013.01); *G06T 2207/30068* (2013.01); *G06T 2207/30096* (2013.01)

(58) Field of Classification Search
CPC . G06T 2207/20084; G06T 2207/30068; G06T 2207/30096; G06T 2207/10116; G06T 2207/20036; G06T 2207/20132; G06V 10/25; G06N 3/045; G06N 3/08
See application file for complete search history.

(56) References Cited

U.S. PATENT DOCUMENTS

| | | | |
|---|---|---|---|
| 10,779,785 B2 | 9/2020 | Itu et al. | |
| 10,846,853 B2* | 11/2020 | Ihara | G06V 10/764 |
| 2006/0120608 A1 | 6/2006 | Luo et al. | |
| 2010/0158332 A1* | 6/2010 | Rico | A61B 5/7203 |
| | | | 382/128 |
| 2013/0030278 A1* | 1/2013 | Seong | G06T 7/0012 |
| | | | 600/407 |
| 2015/0230773 A1 | 8/2015 | Cho et al. | |
| 2018/0253839 A1 | 9/2018 | Zur | |
| 2019/0096060 A1 | 3/2019 | Zhang et al. | |
| 2019/0108441 A1* | 4/2019 | Thibault | G06T 11/003 |
| 2020/0167928 A1* | 5/2020 | Heindl | A61B 5/055 |

FOREIGN PATENT DOCUMENTS

| | | |
|---|---|---|
| CN | 104840209 A | 8/2015 |
| CN | 106339591 A | 1/2017 |
| CN | 107240102 A | 10/2017 |
| CN | 107424152 A | 12/2017 |
| CN | 107563123 A | 1/2018 |
| CN | 107749061 A | 3/2018 |
| CN | 107886514 A | 4/2018 |
| CN | 108464840 A | 8/2018 |
| CN | 108510482 A | 9/2018 |
| CN | 108615237 A | 10/2018 |
| CN | 108765409 A | 11/2018 |
| CN | 109146899 A | 1/2019 |
| CN | 109190540 A | 1/2019 |
| CN | 110009600 A | 7/2019 |
| EP | 2911111 A2 | 8/2015 |
| EP | 3432263 A1 | 1/2019 |

OTHER PUBLICATIONS

The State Intellectual Property Office of the People's Republic of China (SIPO) Office Action 1 for 201910115522.9, dated Jan. 28, 2021 14 Pages (including translation).

The State Intellectual Property Office of the People's Republic of China (SIPO) Office Action 1 for for 201910735273.3, Sep. 1, 2020 12 Pages (including translation).

The European Patent Office (EPO) The Extended European Search Report for 20755919.6 dated Mar. 30, 2022 12 Pages.

Maxine Tan et al., "Reduction of false positive recalls using a computerized mammographic image feature analysis scheme," Physics in Medicine and Biology, Institute of Physics Publishing, Bristol GB, vol. 59, No. 15, Jul. 17, 2014 (Jul. 17, 2014), pp. 4357-4373. 17 pages.

M. Arfan Jaffar et al., "Multi Domain Features Based Classification of Mammogram Images Using SVM and MLP," Innovative Computing, Information and Control (ICICIC) , 2009 Fourth International Conference on, IEEE, Piscataway, NJ, USA, Dec. 7, 2009 (Dec. 7, 2009) , pp. 1301-1304. 4 pages.

Samual H. Lewis et al., "Detection of breast tumor candidates using marker-controlled watershed segmentation and morphological analysis," Image Analysis Ano Interpretation (SSIAI) , 2012 IEEE Southwest Symposium on, IEEE, Apr. 22, 2012 (Apr. 22, 2012), pp. 1-4. 4 pages.

* cited by examiner

MEDICAL IMAGE REGION SCREENING METHOD AND APPARATUS AND STORAGE MEDIUM

CROSS-REFERENCES TO RELATED APPLICATIONS

This application is a continuation application of PCT Patent Application No. PCT/CN2020/074782, entitled "METHOD AND APPARATUS FOR FILTERING MEDICAL IMAGE AREA, AND STORAGE MEDIUM" and filed on Feb. 12, 2020, which claims priority to Chinese Patent Application No. 201910115522.9, entitled "MEDICAL IMAGE REGION SCREENING METHOD AND APPARATUS AND STORAGE MEDIUM" and filed with China National Intellectual Property Administration on Feb. 14, 2019, the entire contents of both of which are incorporated herein by reference.

FIELD OF THE TECHNOLOGY

The present disclosure relates to the field of image recognition, and specifically, to a medical image region screening method and apparatus and a storage medium.

BACKGROUND OF THE DISCLOSURE

Medical images are applied to early diagnosis of cancer. A tumor is an important local feature for determining whether the tissue of a living organism is normal or not. The screening for suspected malignant tumors can provide doctors with a better reference for determining whether tumors are benign or malignant and is an important factor for cancer diagnosis.

SUMMARY

Embodiments of the present disclosure provide a medical image region screening method and apparatus and a storage medium, so that the accuracy of medical image region screening can be improved.

The embodiments of the present disclosure provide a medical image region screening method, including: obtaining a medical image of biological tissue, segmenting tissue regions of a plurality of tissue types from the medical image, selecting, from the tissue regions of the plurality of tissue types based on types of capturing positions of the medical image, a reserved region, obtaining a positional relationship between the reserved region and a predicted lesion region in the medical image; and screening for the predicted lesion region in the medical image based on the positional relationship, to obtain a target lesion region.

Correspondingly, the embodiments of the present disclosure further provide a medical image region screening apparatus, including: an obtaining module, configured to obtain a medical image of biological tissue; a segmentation module, configured to segment tissue regions of a plurality of tissue types from the medical image; a reservation module, configured to select, from the tissue regions of the plurality of tissue types based on types of capturing positions of the medical image, a reserved region; a positional relationship obtaining module, configured to obtain a positional relationship between the reserved region and a predicted lesion region in the medical image; and a screening module, configured to screen the predicted lesion region in the medical image based on the positional relationship, to obtain a target lesion region.

Correspondingly, the embodiments of the present disclosure further provide a medical image region screening device including a processor and a memory. The memory is configured to store medical image data and a plurality of computer instructions. The processor is configured to read the plurality of computer instructions stored in the memory to perform a plurality of operations. The operations include: obtaining a medical image of biological tissue, segmenting tissue regions of a plurality of tissue types from the medical image, selecting, from the tissue regions of the plurality of tissue types based on types of capturing positions of the medical image, a reserved region, obtaining a positional relationship between the reserved region and a predicted lesion region in the medical image; and screening for the predicted lesion region in the medical image based on the positional relationship, to obtain a target lesion region.

Correspondingly, the embodiments of the present disclosure further provide a non-transitory storage medium, the storage medium storing computer instructions, the computer instructions, when executed by a processor, causing the processor to perform a plurality of operations. The operations include: obtaining a medical image of biological tissue, segmenting tissue regions of a plurality of tissue types from the medical image, selecting, from the tissue regions of the plurality of tissue types based on types of capturing positions of the medical image, a reserved region, obtaining a positional relationship between the reserved region and a predicted lesion region in the medical image; and screening for the predicted lesion region in the medical image based on the positional relationship, to obtain a target lesion region.

BRIEF DESCRIPTION OF THE DRAWINGS

To describe the technical solutions in the embodiments of the present disclosure more clearly, the following briefly describes accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The technical solutions in the embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

The embodiments of the present disclosure provide a medical image region screening method and apparatus and a storage medium.

The embodiments of the present disclosure provide a medical image region screening method. An execution body of the medical image region screening method may be a medical image region screening apparatus provided by the embodiments of the present disclosure, or a network device integrated with the medical image region screening apparatus. The medical image region screening apparatus may be implemented in a hardware or software manner. The network device may be a device such as a smartphone, a tablet computer, a palmtop computer, a notebook computer, or a desktop computer.

Figure 1:
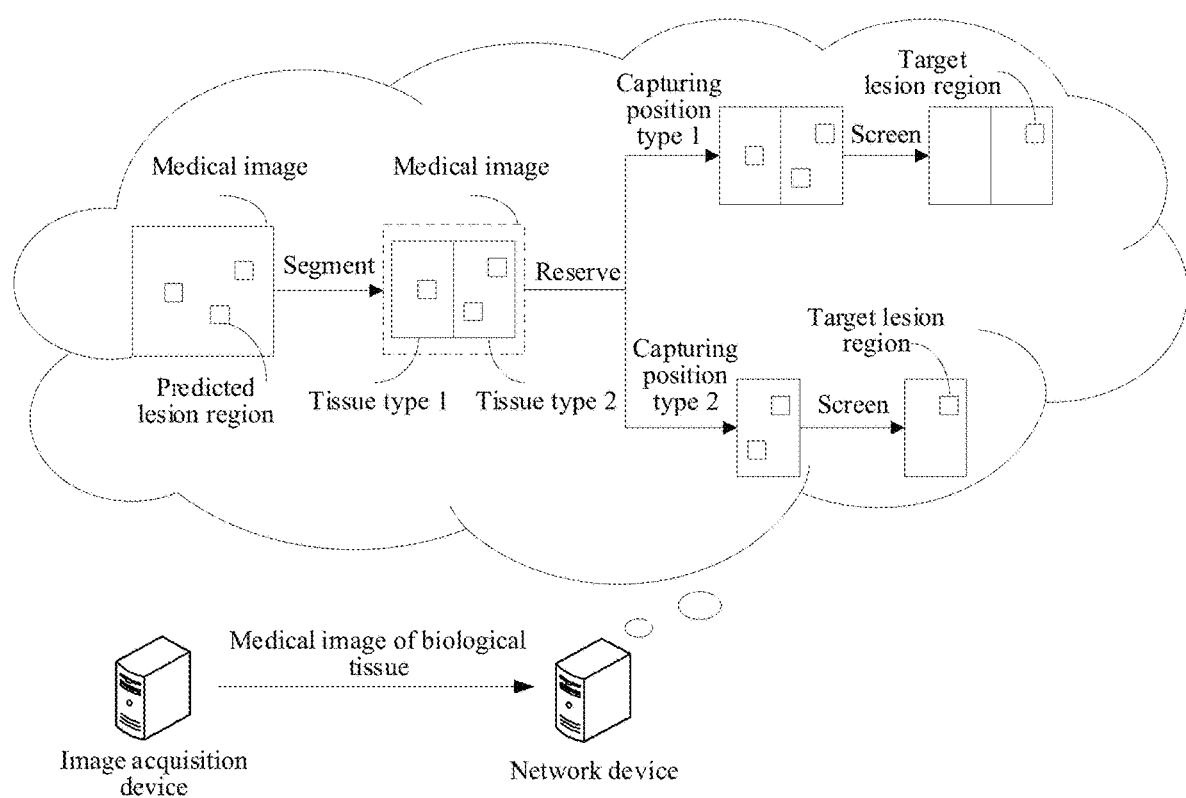
FIG. 1 is a schematic diagram of a scenario of a medical image region screening system according to an embodiment of the present disclosure.

FIG. 1 is a schematic diagram of an application scenario of a medical image region screening method according to an embodiment of the present disclosure. An example in which the medical image region screening apparatus is integrated in a network device is used. The network device may obtain a medical image of a target part/site of biological tissue, segment tissue regions of a plurality of tissue types from the medical image, select, from the tissue regions of the plurality of tissue types based on types of capturing positions of the medical image, a reserved region that needs to be reserved, obtain a positional relationship between the reserved region and a predicted lesion region in the medical image; and screen the predicted lesion region in the medical image based on the positional relationship, to obtain a target lesion region.

Figure 2:
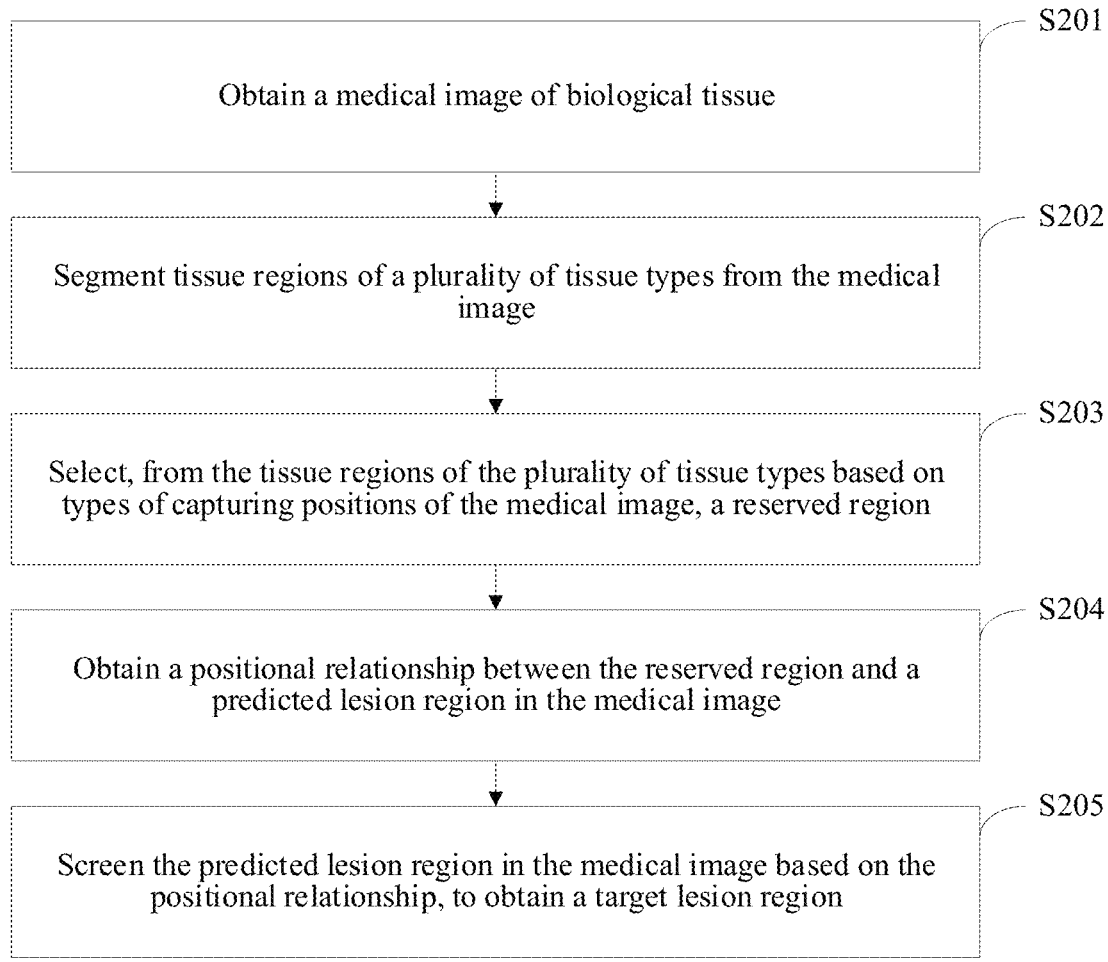
FIG. 2 is a schematic flowchart of a medical image region screening method according to an embodiment of the present disclosure.

FIG. 2 is a schematic flowchart of a medical image region screening method according to an embodiment of the present disclosure. A specific process of the medical image region screening method according to an embodiment of the present disclosure may be as follows:

201. Obtain a medical image of a target part/site of biological tissue.

The biological tissue may be tissue positions in an organism, such as a living object or an object that has been lived. For example, when the living object is a human body, the biological tissue may be muscle tissue, subcutaneous tissue, and the like. The biological tissue may be tissue composed of positions of the living object, for example, breast position tissue, eye position tissue, and the like. The biological tissue may be tissue composed of some positions of the living object, for example, pupil tissue in eyes, breast tissue in the breast, and the like.

The living object is an object that can respond to external stimuli and have life forms, for example, may be a human, a cat, a dog, or the like.

The medical image of the target part (abbreviated as medical image hereinafter) is an image obtained by imaging/capturing the biological tissue, and a pathologic condition of the biological tissue may be determined through the medical image. For example, the medical image may be a mammographic image. The mammographic image is an image obtained by a mammography X-ray machine, and is applied to mammography examination. At present, the mammography examination is the first choice and the easiest and most reliable non-invasive detection method for the diagnosis of breast diseases.

There may be a plurality of manners of obtaining the medical image of the biological tissue. For example, when the medical image is the mammographic image, the mammographic image may be obtained by using the mammography X-ray machine, or the mammographic image may be obtained from the local network device, or the mammographic image may be downloaded through the Internet.

202. Segment tissue regions of a plurality of tissue types from the medical image. In some embodiments, each tissue region may correspond to one of the tissue types.

The tissue types are types of different tissue included in the medical image. For example, when the medical image is the mammographic image, the breast may be considered as a tissue type, or muscle in the mammographic image may be considered as a tissue type. A tissue region segmented from the mammographic image may include a muscle tissue type, a breast tissue type, and the like.

In a process of recognizing a target lesion region in the mammographic image, non-target lesion regions such as lymph nodes and nipples are recognized as target lesion regions, resulting in misjudgment. To reduce the misjudgment of a target lesion region and improve accuracy, tissue regions of a plurality of tissue types are segmented from the mammographic image, that is, tissue regions of the muscle tissue type and the breast tissue type are segmented from the mammographic image, so that the lymph nodes and nipples that are misjudged as target lesion regions can be removed, thereby improving the accuracy of recognizing a target lesion region.

In an embodiment, to improve accuracy of segmenting the tissue region from the medical image, a network model may be used to segment the image. Specifically, the step "segment tissue regions of a plurality of tissue types from the medical image" may include:

segmenting the tissue regions of the plurality of tissue types from the medical image based on a region segmentation network model, where the region segmentation network model is trained by using a plurality of sample medical images (e.g., images of the same target part/site).

The region segmentation network model is a deep learning segmentation network model. For example, the region segmentation network model may be a full convolutional network (FCN) model. The FCN model may classify images at a pixel level, thereby resolving the problem of image segmentation at a semantic level. The FCN model may accept input images of any dimension, a deconvolutional subnetwork is adopted to up-sample a feature map of the last convolutional layer to restore the feature map to the same dimension as the input image, so that each pixel can be predicted, spatial information in the original input image is retained, and classification for the each pixel is then performed on the up-sampled feature map. The FCN model is equivalent to replacing the last fully-connected layer of the convolutional neural network with the convolutional layer, and a marked image is outputted.

In an embodiment, for example, the region segmentation network model may be replaced with a similar network model (for example, a U-Net network model).

The U-Net network model is an image segmentation network model used in the medical field. The U-Net network model may freely deepen a network structure according to a selected data set when targets with larger receptive fields are processed, and the U-Net network model may adopt a superposition method when shallow feature fusion is performed.

In an embodiment, to improve the accuracy of region screening, specifically, the step "segment the tissue regions of the plurality of tissue types from the medical image based on a region segmentation network model" may include:

performing convolution processing on the medical image based on the convolutional subnetwork, to obtain a feature of the image;

performing up-sampling on the feature based on the deconvolutional subnetwork, to obtain a feature image with a restored dimension; and classifying the feature image with the restored dimension, to obtain the tissue regions of the plurality of tissue types.

The region segmentation network model may include a convolutional subnetwork and a deconvolutional subnetwork.

The convolutional subnetwork may include a convolutional layer and a pooling layer. The convolutional layer is formed by several convolutional units for convolution operation. An objective of the convolution operation is to extract different features that are inputted. A first convolutional layer may merely extract some lower-level features such as edges, lines, and angles. However, more layers of networks can iteratively extract more complex features from the low-level features. The pooling layer may compress the inputted feature map, to reduce the feature map to simplify network calculation complexity in one aspect and perform feature compression to extract main features in another aspect.

The deconvolutional subnetwork may include a deconvolutional layer used for deconvolution operation. The deconvolution is also referred to as transposed convolution. A forward propagation process of the convolutional layer is a back-propagation process of the deconvolutional subnetwork, and a back-propagation process of the convolutional layer is a forward propagation process of the deconvolutional subnetwork. Therefore, a dimension of the feature image may be restored through the deconvolutional subnetwork.

During actual application, for example, when the region segmentation network model is the FCN model, the mammographic image may be inputted into the FCN model, and convolution processing is performed on the convolutional subnetwork including a plurality of convolutional layers, to obtain the feature of the image, and up-sampling is then performed on the feature through the deconvolutional layer in the deconvolutional subnetwork, the dimension of the feature image is restored, and the feature image with the restored dimension is classified, to obtain the tissue regions of the muscle tissue type and the breast tissue type.

In an embodiment, the medical image region screening method may further include training steps of the region segmentation network model.

For example, when the region segmentation network model is the FCN model, an initialization weight of the FCN model may be obtained by using a segmentation data set PASCAL VOC, a medical mammography image public dataset (Digital Database for Screening Mammography, (DDSM)) may then be used for performing transfer learning, and 3000 cases of mammography data of the tissue regions of the muscle tissue type and the breast tissue type marked by the domestic hospitals are used for performing the transfer learning. For example, when the network model is trained, a size of batch processing is 4, a learning rate is 0.00001, and a maximum quantity of iterations may be 20000. Finally, the trained region segmentation network model may be obtained, and segmentation may be performed on the tissue regions of the plurality of tissue types by using the region segmentation network model.

The segmentation data set (pattern analysis, statistical modelling, and computational learning visual object classes, PASCAL VOC) is a standardized image data set for object type recognition, and may be alternatively a public tool set for accessing data sets and annotations.

The medical mammography image public dataset (DDSM) is a database established by a medical institution to store breast cancer images. The DDSM database stores data types such as a malignant type, a conventional type, and a benign type. At present, many studies on the breast cancer are based on the DDSM database.

The transfer learning is to transfer trained model parameters to a new model, to facilitate the training of a new model. Considering that most of the data or tasks are related, the learned model parameters may be shared with the new model in a manner through the transfer learning, thereby accelerating and optimizing the learning efficiency of the model without learning from scratch like most networks. In the embodiments of the present disclosure, the network model data training is performed in a manner of parameter migration, and a model trained by using a task A can be configured to initialize model parameters of a task B, so that the task B can learn training convergence faster.

203. Select, from the tissue regions of the plurality of tissue types based on types of capturing positions of the medical image, a reserved region that needs to be reserved. In some embodiments, the reserved region may include one or more of the tissue regions.

The types of capturing positions of the medical image are different types of capturing positions caused by different shooting/imaging positions during the capturing of the medical image. For example, when the medical image is the mammographic image, the capturing position type may include a CC position (that is, an axial position, a X-ray beam is projected from top to bottom), an MLO position (that is, a lateral oblique position, which may include a mediolateral oblique position and a lateromedial oblique position, where the mediolateral oblique position is that a film is disposed below the outside of the breast, and the X-ray beam is projected at 45 degrees from the top of the inner breast to the bottom of the outer breast, whereas the lateromedial oblique position is opposite), a lateral position, a local spot film, and spot film magnification photography.

The reserved regions are, for the medical images of different types of capturing positions, different regions that need to be reserved for the tissue regions of the plurality of tissue types. For example, when the types of capturing positions are different, the tissue regions of the different tissue types may be selected according to an actual situation for reservation, to improve accuracy of region screening.

During actual application, for example, when the medical image is the mammographic image, the types of capturing positions include the CC position and the MLO position, and the tissue regions of the plurality of tissue types include the tissue regions of the muscle tissue type and the breast tissue type. When the mammographic image is at the CC position, only the tissue region of the breast tissue type is reserved, and when the mammographic image is at the MLO position, the tissue regions of the muscle tissue type and the breast tissue type are reserved.

In an embodiment, for the different types of capturing positions, the tissue regions of different tissue types may be reserved according to an actual situation. For example, when the mammographic image is at the CC position and the MLO position, the tissue regions of the muscle tissue type and the breast tissue type may further be reserved.

In an embodiment, to reduce the misjudgment of a target lesion region and improve the accuracy of region screening, specifically, the step "select, from the tissue regions of the plurality of tissue types based on types of capturing positions of the medical image, a reserved region that needs to be reserved" may include:
   obtaining a mapping relationship set, the mapping relationship set including a mapping relationship between a preset capturing position type of the medical image and a tissue type (e.g., each mapping relationship in the mapping relationship set indicating a correspondence between a preset capturing position type of the medical image and a tissue type);
   obtaining a tissue type corresponding to a capturing position type according to the mapping relationship; and
   selecting, from the tissue regions of the plurality of tissue types, the reserved region that needs to be reserved.

The mapping relationship set includes a mapping relationship between the capturing position type of the medical image and the tissue type. For example, when the mammographic image is at the CC position, the tissue region of the breast tissue type is correspondingly reserved, and when the mammographic image is at the MLO position, the tissue regions of the muscle tissue type and the breast tissue type are correspondingly reserved. The reserved region that needs to be reserved is selected from the tissue regions of the plurality of tissue types according to the mapping relationship.

In an embodiment, the mapping relationship may be adjusted according to an actual situation. For example, the mapping relationship may be alternatively: when the mammographic image is at the CC position, the tissue regions of the muscle tissue type and the breast tissue type are correspondingly reserved, and when the mammographic image is at the MLO position, the tissue regions of the muscle tissue type and the breast tissue type are correspondingly reserved.

204. Obtain a positional relationship between the reserved region and a predicted lesion region in the medical image. In some embodiments, the predicted lesion region in the medical image may be automatically obtained by a computing device by executing any suitable detection algorithm on the medical image (e.g., a pattern recognition algorithm, a neural network classifier trained according to medical images from a database, a combination of one or more image preprocessing and filtering techniques for target detection, etc.). The predicted lesion region is considered as a candidate region that needs to be further screened to determine whether it includes a target lesion region. In some embodiments, the computing device may automatically determine one or more predicted/candidate lesion regions from one medical image.

The positional relationship may be a region positional relationship between the reserved region and the predicted lesion region, and the positional relationship may be defined according to the actual situation. For example, the positional relationship between the reserved region and the predicted lesion region may include: the predicted lesion region is completely located in the reserved region, the predicted lesion region is partially located in the reserved region, or the predicted lesion region is not located in the reserved region.

In an embodiment, for example, the positional relationship between the reserved region and the predicted lesion region may be that the predicted lesion region is located on the upper left or the upper right of the reserved region.

There may be a plurality of manners of obtaining the positional relationship. For example, image overlapping may be performed on the reserved region and the medical image including the predicted lesion region in a manner of image overlapping, to obtain the positional relationship. For example, an anchor point position of the reserved region may be determined in the medical image including the predicted lesion region (for example, two vertices on a diagonal line of the reserved region may be determined as the anchor points of the reserved region), and the image overlapping is performed on the reserved region and the medical image including the predicted lesion region, thereby obtaining the positional relationship between the reserved region and the predicted lesion region.

In an embodiment, for example, coordinate information of the reserved region and the predicted lesion region may further be obtained to obtain the positional relationship between the reserved region and the predicted lesion region. For example, the coordinate information of the reserved region may be compared with the coordinate information of the predicted lesion region to obtain position information of the predicted lesion region in the reserved region.

The predicted lesion region is a region that may have a lesion detected in the medical image (e.g., automatically detected by a medical image. The predicted lesion region includes a region that has been lesioned, and may alternatively include a region that does not have a lesion but is misjudged as a lesion region.

There may be a plurality of manners of obtaining the predicted lesion region. For example, the predicted lesion region may be obtained by manually recognizing the medical image in advance, or may be obtained by detecting the predicted lesion region in the medical image by using the network model. For a specific procedure, refer to the following FIG. 3.

205. Screen the predicted lesion region in the medical image based on the positional relationship, to obtain a target lesion region. In some embodiments, the target lesion region is automatically identified by the computing device.

The predicted lesion region is a suspected lesion area that has been located in the medical image. For example, when the medical image is the mammographic image, the predicted lesion region may be a suspected malignant tumor located in the mammographic image.

The target lesion region is the predicted lesion region that has been screened. For example, when the medical image is the mammographic image, the target lesion region may be a malignant tumor.

In a process of recognizing a target lesion region in the mammographic image, non-target lesion regions such as lymph nodes and nipples are recognized as target lesion regions, resulting in misjudgment. To reduce the misjudgment of a target lesion region and improve accuracy, the predicted lesion region may be screened, to obtain a target lesion region, the lymph nodes and nipples that are misjudged as target lesion regions are removed, thereby improving the accuracy of recognizing a target lesion region.

In an embodiment, the reserved region and the predicted lesion region are both obtained based on the detection of the same target position medical image. Therefore, the positional relationship between the reserved region and the predicted lesion region in the medical image may be obtained, and the predicted lesion region that falls within or intersects the reserved region is filtered out, to obtain the target lesion region, thereby improving accuracy of medical image region screening. In other words, in some embodiments, the obtained target lesion region does not intersect with the reserved region; and in some other embodiments, the obtained target lesion region intersects with the reserved region but does not fall entirely within the reserved region. In some embodiments, when a size of the intersected area between the reserved region and the predicted lesion region is greater than or equal to a threshold percentage of a size of the predicted lesion region, the predicted lesion region is screened out. In some embodiments, when a size of the intersected area between the reserved region and the predicted lesion region is greater than or equal to a threshold percentage of a size of the reserved region, the predicted lesion region is screened out.

During actual application, the predicted lesion region in the medical image is screened based on the positional relationship, to obtain the target lesion region. For example, when the reserved region includes the tissue region of the muscle tissue type and the tissue region of the breast tissue type, the positional relationship between the reserved region and the predicted lesion region may be obtained, and according to the positional relationship, the predicted lesion region falling into the muscle region and the nipple region that are in the reserved region is screened out, or otherwise, the predicted lesion region is recognized as the target lesion region.

In an embodiment, for example, a part of the predicted lesion region that falls within a preset position region in the reserved region may be filtered out according to the positional relationship between the reserved region and the predicted lesion region. For example, according to an actual situation, a part of the predicted lesion region included in a preset size region in an upper left corner of the reserved region is screened out and excluded from the target lesion region.

Figure 3:
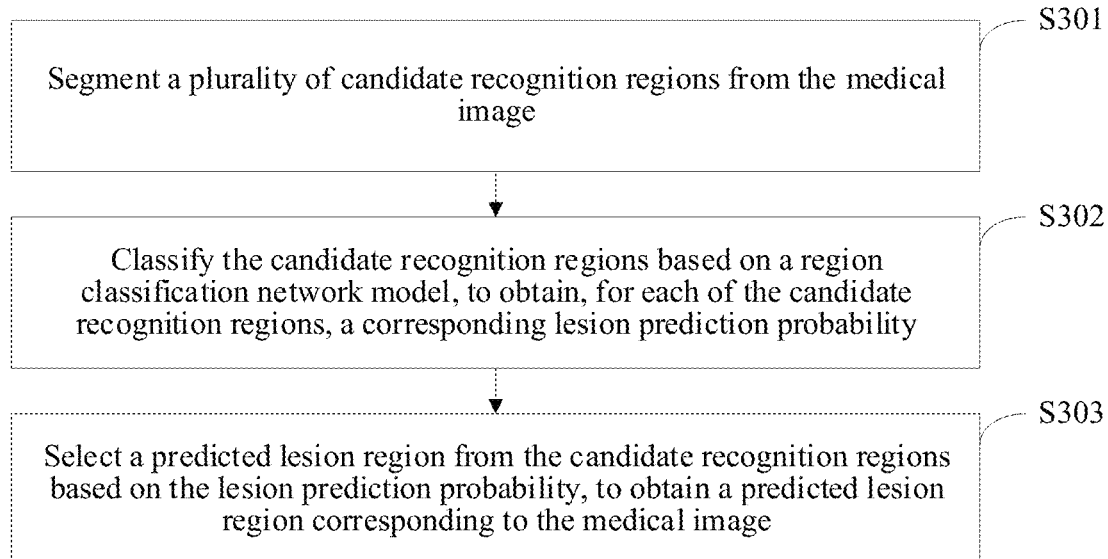
FIG. 3 is another schematic flowchart of a medical image region screening method according to an embodiment of the present disclosure.

In an embodiment, referring to FIG. 3, the predicted lesion region may be obtained by obtaining a marked image, or may be obtained in the following manner. A process of obtaining the predicted lesion region is as follows:

301. Segment a plurality of candidate recognition regions from the medical image.

The candidate recognition region may include a region of the predicted lesion region. For example, when the medical image is the mammographic image, the candidate recognition region may include a region of a malignant tumor. The candidate recognition region is segmented, so that the efficiency of region screening can be improved.

In an embodiment, the plurality of candidate recognition regions are segmented from the medical image, so that the accuracy of region screening can be improved. Specifically, the step "segment a plurality of candidate recognition regions from the medical image" may include:

extracting a sub-image from the medical image; and
segmenting the plurality of candidate recognition regions from the sub-image.

The sub-image may be an image cropped from the medical image and may describe a certain body part. For example, when the medical image is the mammographic image, the sub-image may be an image of a region in which the breast is located.

During actual application, for example, the image of the region in which the breast is located may be extracted from the mammographic image, and a plurality of candidate recognition regions are segmented from the region in which the breast is located. The region in which the breast is located and the candidate recognition regions are extracted, so that the accuracy of region screening can be improved.

In an embodiment, the sub-image is extracted from the medical image, so that the accuracy of region screening can be improved. Specifically, the step "extract a sub-image from the medical image" may include:

performing grayscale stretching on the medical image, to obtain a stretched target position medical image;
extracting an initial sub-image from the stretched target position medical image;
performing histogram equalization on an image histogram of the initial sub-image, to obtain an equalized sub-image; and
filtering the equalized sub-image, to obtain the sub-image.

Operations such as grayscale stretching, histogram equalization, and filtering are all preprocessing operations. The preprocessing is processing performed on an input image before feature extraction, segmentation, and matching. A main objective of the preprocessing is to eliminate irrelevant information in the image, restore useful real information, enhance the detectability of relevant information, and simplify data to the greatest extent, thereby improving the reliability of feature extraction, segmentation, matching, and recognition. The image is preprocessed, so that noise in the image can be reduced, regional homogeneity and the robustness of subsequent processing can be improved, and a preprocessed sub-image is obtained.

The grayscale stretching is a grayscale transformation method, and a piecewise linear transformation function is used for improving a dynamic range of a grayscale when the image is processed.

The image histogram is an image that displays image data in a form of a distribution curve with dark left and bright right. The image histogram may downscale the image in proportion by using an algorithm, has many advantages such as image translation, rotation, zoom invariance, and the like, and is applied to many fields of image processing, for example, threshold segmentation of a grayscale image, color-based image retrieval, image classification, and the like.

The histogram equalization is a method for adjusting, in the field of image processing, a contrast by using the image histogram. Commonly used brightness is effectively expended through the histogram equalization, so that the brightness may be better distributed on the histogram. The histogram equalization is configured to enhance a local contrast without affecting an overall contrast.

Filtering operations can remove the noise in the image, and improve the regional homogeneity.

During actual application, for example, when the medical image is the mammographic image, a grayscale range of the mammographic image is stretched to 0 to 255 through linear stretching. The mammographic image is stretched through the grayscale stretching, so that the robustness of the subsequent processing can be improved.

During actual application, for example, when the medical image is the mammographic image, and the initial sub-image is the image of the region in which the breast is located, a morphological opening operation may corrode first and then expand the stretched mammographic image, to remove fine tissue and noise in the image, so that objects at slender points are separated, and an area of the image is not obviously changed at a boundary of a smooth and relatively large object. An Ostu's method is adopted to perform segmentation, that is, the grayscale image is converted into a binary image. The Ostu's method assumes that the image includes two types of pixels (foreground pixels and background pixels) according to a bimodal histogram. In this way, an optimal threshold that can separate the two types of pixels is calculated, so that intra-class variance of the two types of pixels is the smallest. Because a square distance of the two types of pixels is constant, inter-class variance of the two types of pixels is the largest. The image of the region in which the breast is located may be obtained by using the morphological opening operation and the Ostu's method.

During actual application, for example, when the initial sub-image is the image of the region in which the breast is located, an image histogram corresponding to the image of the region in which the breast is located may be obtained, and the histogram equalization is then performed, to obtain an equalized image of the region in which the breast is located.

During actual application, for example, when the initial sub-image is the image of the region in which the breast is located, the filtering operation is performed on the image of the region in which the breast is located by using bilateral filtering, to obtain the image of the region in which the breast is located. The bilateral filtering is a nonlinear filtering method, is a compromise processing combining spatial proximity and pixel value similarity of an image, and considers both spatial information and grayscale similarity, so as to achieve edge preserving and noise reduction without destroying an edge of image segmentation.

In an embodiment, the plurality of candidate recognition regions may be segmented from the sub-image, thereby improving the accuracy of region screening. Specifically, the step "segment the plurality of candidate recognition regions from the sub-image" may include:
  segmenting the sub-image based on a genetic inheritance algorithm, to obtain a plurality of segmented images;
  performing the morphological opening operation on the segmented images, to obtain operated segmented images; and
  selecting the plurality of candidate recognition regions from the plurality of operated segmented images.

The image segmentation is a technology and process of segmenting an image into several particular regions having special properties, and specifying a target of interest. From the mathematical perspective, the image segmentation is a process of dividing a digital image into disjoint regions. The process of the image segmentation is also a marking process, that is, the pixels belonging to the same region are given to the same numerals. To train and classify the image more easily, the sub-image may be segmented, and the candidate recognition region may be selected from the plurality of segmented regions.

The genetic inheritance algorithm is a calculation model that simulates the biological evolution process of natural selection and genetic mechanism of Darwin's biological evolution theory, and is a method of searching for the optimal solution by simulating the natural evolution process. After the first-generation population is generated, according to the principle of survival of the fittest, an increasingly optimal approximate solution is generated through generational evolution. In each generation, individuals are selected according to the adaptation degrees of individuals in the problem domain, and with the help of the genetic operators of the natural genetics, the combination, crossover, and mutation are performed, to generate a population representing a new solution set.

During actual application, for example, dimensions of the sub-image may be reduced by using 2D-wavelet transform first. For a low-detail image, the image may be segmented based on the image histogram of the image. For segmentation of the image histogram, the genetic inheritance algorithm may be used, and mapping, in a form of binary coding, from a phenotype to a gene is implemented. A length of the binary coding sequence may be a quantity of image grayscales, so that when a value of a bit is 0, it indicates that the grayscale is a segmentation threshold. A value function of the genetic inheritance algorithm is a method for measuring a level of excellence of the chromosomes. The value function takes a maximum inter-class variance and a minimum intra-class variance as a standard. After population initialization, three processes of iterative selection, crossover, and aberration are repeated until convergence is achieved. For example, a quantity of the initial populations may be 30, a quantity of iterations may be 40, a selectivity may be 10%, a crossover rate may be 80%, and an aberration rate may be 10%. Finally, a segmentation threshold is outputted, and the segmentation is performed on the sub-image according to the segmentation threshold, to obtain the plurality of segmented images.

The morphological opening operation may then be performed on the segmented images, to obtain operated segmented images. For example, the segmented images may be corroded first and then expanded, to remove fine tissue and noise in the image, objects at slender points are separated, an area of the image is not obviously changed at a boundary of a smooth and relatively large object, and glands are disconnected, to facilitate subsequent region extraction.

During actual application, the plurality of candidate recognition regions are selected from the plurality of operated segmented images. For example, regions with a relatively high grayscale may be extracted from the plurality of operated segmented images. For example, a region with top five grayscales may be extracted from the plurality of operated segmented images, and based on the extracted region, 10 regions with relatively large areas are selected from each mammographic image as the candidate recognition regions.

302. Classify the candidate recognition regions based on a region classification network model, to obtain, for each of the candidate recognition regions, a corresponding lesion prediction probability.

The region classification network model may classify the candidate recognition region to determine whether a network model of the predicted lesion region is included in the candidate recognition region. For example, the region classification network model may be an Inception V3 network model.

The Inception V3 is one of a convolutional neural network. The convolutional neural network is a feed-forward neural network, and an artificial neuron may correspond to a surrounding unit and may perform large-scale image processing. The convolutional neural network includes a convolutional layer and a pooling layer. The Inception V3 increases a width of a single convolutional layer, that is, convolutional kernels with different scales are used on the single convolutional layer, to optimize the network.

The lesion prediction probability is a probability that the candidate recognition region includes the predicted lesion region.

In an embodiment, the candidate recognition regions may be classified by using the network model, to obtain the lesion prediction probability corresponding to the candidate recognition regions, and improve the accuracy of region screening. Specifically, the step "classify the candidate recognition regions based on a region classification network model, to obtain a lesion prediction probability corresponding to the candidate recognition regions" may include:

performing convolution processing on the candidate recognition regions based on the convolutional layer, to obtain features of the region; and classifying the features of the region based on the fully-connected layer, to obtain the lesion prediction probability corresponding to the candidate recognition regions.

The region classification network model is a network model that recognizes the lesion prediction probability corresponding to the candidate recognition regions, for example, may be a deep learning convolutional neural network GoogLeNet (Inception V3), a fully convolutional neural network, and a Resnet network model. The region classification network model may include a convolutional layer and a fully-connected layer.

The Inception V3 network model approximates the optimal local sparse nodes through intensive components, so that computing resource is effectively used, and more features can be extracted in the same calculation amount, thereby improving a training result. The Inception network model has two characteristics: one is to use 1×1 convolution for increasing and decreasing a dimension; and the other is to perform convolution and re-aggregation on a plurality of sizes at the same time.

The convolutional layer is formed by several convolutional units, and a parameter of each convolutional unit is optimized by using a back-propagation algorithm. An objective of an image convolution operation is to extract different features of inputted images. A first convolutional layer may merely extract some lower-level features such as edges, lines, and angles. However, more layers of networks can iteratively extract more complex features from the low-level features.

The fully-connected layer may integrate local information with category distinction in the convolutional layer. An output value of the last fully-connected layer is transferred to an output, and a softmax logistic regression may be used for classification.

During actual application, for example, when the region classification network model is the Inception V3 network model, the candidate recognition region may be inputted into the network model, and convolution processing is performed through the convolutional layer, to obtain the features of the region, and the features of the region are then classified through the fully-connected layer, to obtain the lesion prediction probability corresponding to the candidate recognition regions. For example, when the region classification network model is the Inception V3 network model, through the convolution kernels with various sizes, the neural network undergoing a depth of 22 layers enables the network model to keep sparsity of a network and use high computing performance of a dense matrix.

In an embodiment, the medical image region screening method may further include a training process of the region classification network model.

Specifically, the medical image region screening method may further include:

obtaining positive and negative sample regions, the positive sample region including the predicted lesion region;

performing data enhancement on the positive and negative sample regions, to obtain the enhanced positive and negative sample regions;

updating a model weight in the region classification network model according to the enhanced positive and negative sample regions, to obtain a trained region classification network model; and updating the region classification network model based on the trained region classification network model.

The positive sample region includes the predicted lesion region. The positive and negative sample regions are sample regions in the sample target position medical image marked by a physician. For example, a positive sample may be a mammographic image including a suspected malignant tumor region marked by the physician, and the positive sample includes the entire tumor region and is surrounded by a small background region. A negative sample may be a mammographic image of an obvious benign tumor region and a background region marked by the physician.

Data enhancement may enable limited data to generate more equivalent data, so that a quantity of the samples is increased, and the samples are enhanced.

The transfer learning is a new machine learning method that uses existing knowledge to resolve problems in different but related fields. The transfer learning loosens two basic assumptions in conventional machine learning, and an objective is to transfer the existing knowledge to resolve learning problems in the target field in which there is only a small amount or even none of labeled sample data.

During actual application, there are a plurality of manners of obtaining the positive and negative sample regions. For example, experts may be hired to mark the data by using domestic hospital data, and the positive and negative sample regions may be downloaded locally or from the Internet, and the like.

During actual application, the data enhancement is performed on the positive and negative sample regions, to obtain the enhanced positive and negative sample regions. For example, because the image in which the positive and negative sample regions are located is the mammographic image, data enhancement of flipping and cropping on the positive and negative sample regions is mainly performed, while data enhancement of color space is not required, so that a plurality of enhanced positive and negative sample regions are obtained.

During actual application, for example, when the region classification network model is the Inception V3 network model, a quantity of output categories of the model may be set to 2, an ImageNet dataset (computer vision standard dataset) may be first used during weight initialization of the model, and the public dataset DDSM is then used. The public dataset DDSM is a database established by a medical institution in the United States to store breast cancer images. Finally, the enhanced positive and negative sample regions are used for transfer learning to update the weight in the region classification network model. For example, a root mean square prop (RMSprop, an adaptive learning rate method based on a root mean square) may be used as a descent algorithm, a size of batch processing may be 64, an initial learning rate is 0.01, and a maximum quantity of iterations is 100000. After training is completed, the trained region classification network model is obtained, and the region classification network model is then updated based on the trained region classification network model, to obtain the region classification network model.

303. Select a predicted lesion region from the candidate recognition regions based on the lesion prediction probability, to obtain a predicted lesion region corresponding to the medical image.

During actual application, for example, the plurality of candidate recognition regions may be segmented from the mammographic image, the plurality of candidate recognition regions are inputted into the region classification network model for classification, to obtain the lesion prediction probability corresponding to the candidate recognition regions, and the predicted lesion region is then selected from the candidate recognition regions based on the lesion prediction probability. For example, the candidate recognition region with a lesion prediction probability greater than 0.5 may be determined as the predicted lesion region.

In an embodiment, for example, an overlapping region of the predicted lesion region may be removed by using a non-maximum suppression method, and an overlapping degree threshold may be set to 50%, so that a false alarm rate can be reduced, and accuracy of positioning a predicted lesion region can be improved.

Figure 5:
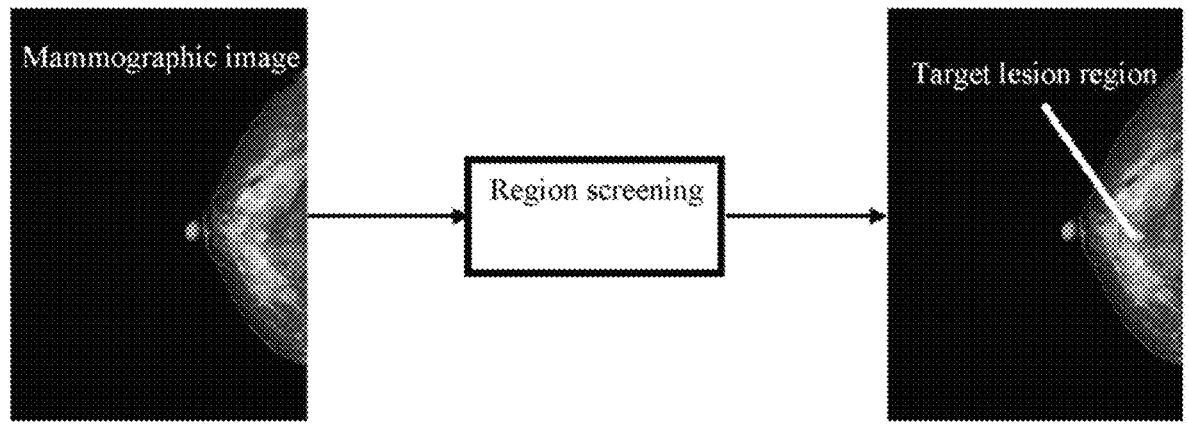
FIG. 5 is a schematic diagram of an application scenario according to an embodiment of the present disclosure.

Referring to FIG. 5, the medical image region screening method may recognize the target lesion region from the mammographic image, and mark the target lesion region, for example, perform marking with a box.

It may be learned from above that, in the embodiments of the present disclosure, the medical image of the biological tissue is obtained, the tissue regions of the plurality of tissue types are selected from the medical image, the reserved region that needs to be reserved is selected from the tissue regions of the plurality of tissue types based on the types of capturing positions of the medical image, the positional relationship between the reserved region and the predicted lesion region in the medical image is obtained, and the predicted lesion region in the medical image is screened based on the positional relationship, to obtain the target lesion region. In the solution, diverse features of the image are extracted by using two neural networks connected in parallel, thereby reducing manual workload and improving automation degree, accuracy, efficiency, and application promotion. Based on the capturing position type of the medical image, a region that needs to be reserved is selected from the tissue regions of the plurality of tissue types, and based on the reserved region, the predicted lesion region corresponding to the medical image is screened, so that the lymph nodes and nipples that interfere with determination of the target lesion region can be effectively screened out, and the misjudgment of a target lesion region is reduced, thereby improving the accuracy of region screening.

According to the method described in the foregoing embodiments, the following further provides detailed description by using examples.

Figure 4:
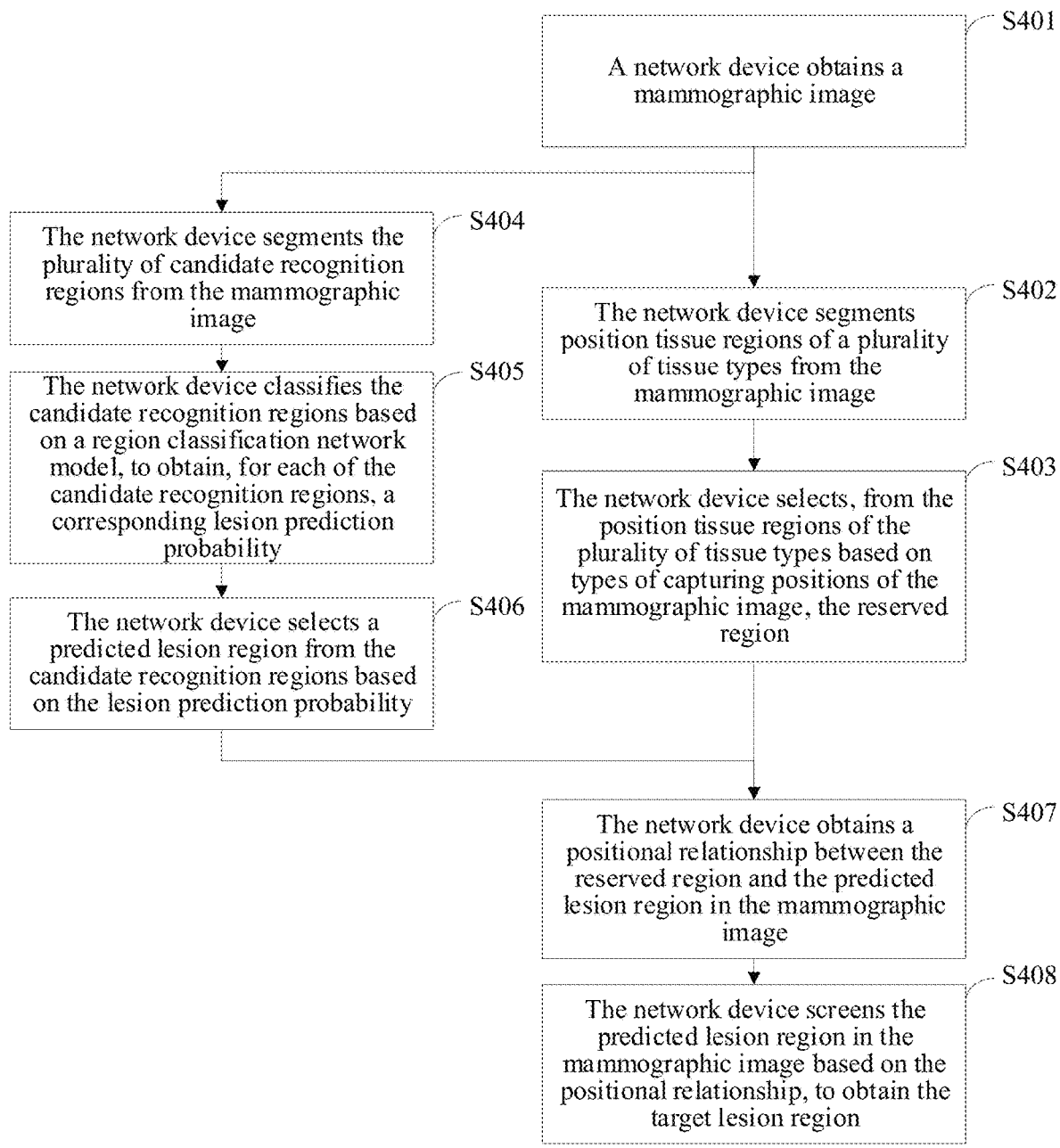
FIG. 4 is yet another schematic flowchart of a medical image region screening method according to an embodiment of the present disclosure.

Referring to FIG. 4, in one embodiment, descriptions are provided by using an example in which the medical image region screening apparatus is specifically integrated into a network device.

401. A network device obtains a mammographic image.

Figure 9:
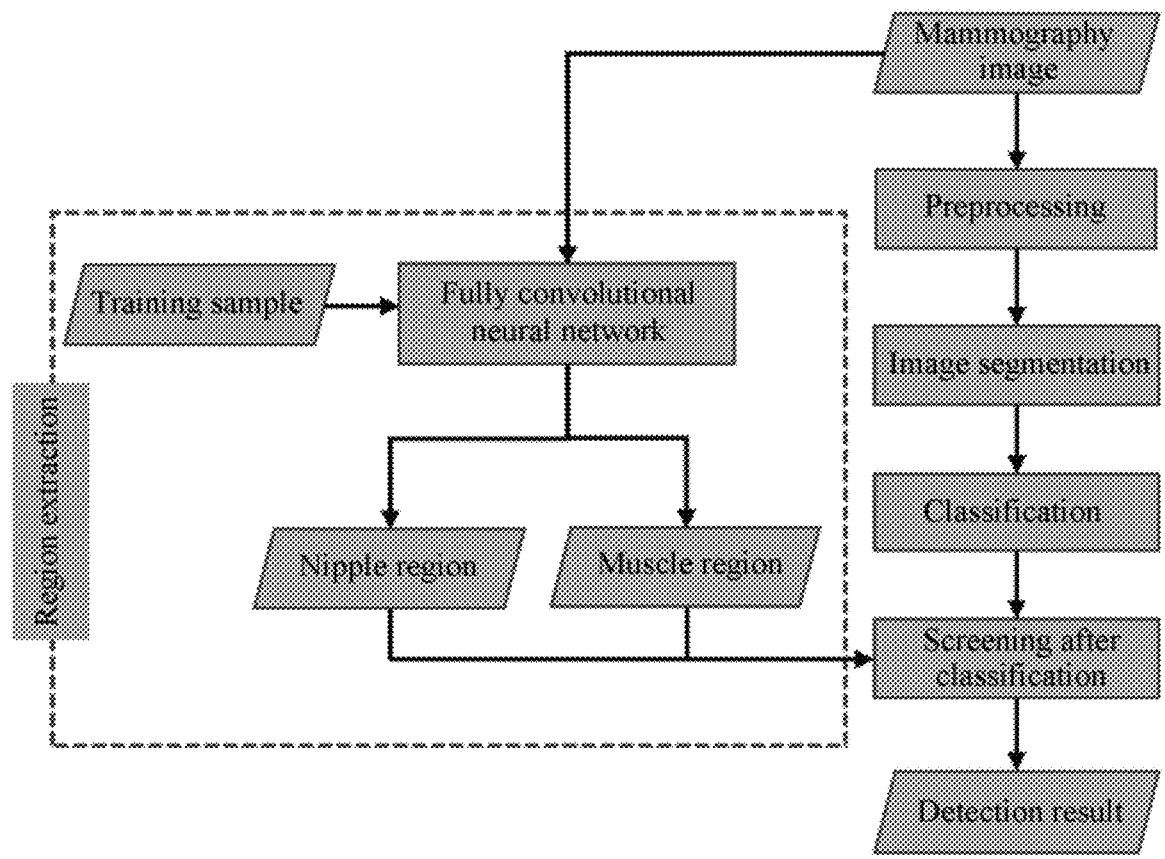
FIG. 9 is a schematic flowchart according to an embodiment of the present disclosure.

During actual application, referring to FIG. 9, there are a plurality of manners of obtaining, by the network device, the mammographic image. For example, the mammographic image may be obtained by the mammography X-ray machine, or the mammographic image may be obtained locally, or the mammographic image may be downloaded through the Internet.

402. The network device segments tissue regions of a plurality of tissue types from the mammographic image.

In a process of recognizing a target lesion region in the mammographic image, non-target lesion regions such as lymph nodes and nipples are recognized as target lesion regions, resulting in misjudgment. To reduce the misjudgment of a target lesion region and improve accuracy, tissue regions of a plurality of tissue types are segmented from the mammographic image, that is, tissue regions of the muscle tissue type and the breast tissue type are segmented from the mammographic image, so that the lymph nodes and nipples that are misjudged as target lesion regions can be removed, thereby improving the accuracy of recognizing a target lesion region.

During actual application, referring to FIG. 9, the network device may segment the tissue regions of the plurality of tissue types from the mammographic image based on the region segmentation network model, where the region segmentation network model is trained by using a plurality of sample medical images.

Specifically, convolution processing may be performed on the mammographic image based on a convolutional subnetwork, to obtain the feature of the image, up-sampling is then performed on the feature based on the deconvolutional subnetwork, to obtain a feature image with a restored dimension, and finally, the feature image with the restored dimension is classified, to obtain the tissue regions of the plurality of tissue types.

During actual application, the convolution processing is performed on the mammographic image based on the convolutional subnetwork, to obtain the feature of the image, up-sampling is performed on the feature based on the deconvolutional subnetwork, to obtain the feature image with the restored dimension, and finally, the feature image with the restored dimension is classified, to obtain the tissue regions of the plurality of tissue types. For example, when the region segmentation network model is the FCN model, the mammographic image may be inputted into the FCN model, and convolution processing is performed on the convolutional subnetwork including a plurality of convolutional layers, to obtain the feature of the image, and up-sampling is then performed on the feature through the deconvolutional layer in the deconvolutional subnetwork, the dimension of the feature image is restored, and the feature image with the restored dimension is classified, to obtain the tissue regions of the muscle tissue type and the breast tissue type.

In an embodiment, the medical image region screening method may further include training steps of the region segmentation network model. For example, when the region segmentation network model is the FCN model, an initialization weight of the FCN model may be obtained by using a segmentation data set PASCAL VOC, a medical mammography image public dataset DDSM may then be used for performing transfer learning, and 3000 cases of mammography data of the tissue regions of the muscle tissue type and the breast tissue type marked by the domestic hospitals are used for performing the transfer learning. For example, when the network model is trained, a size of batch processing is 4, a learning rate is 0.00001, and a maximum quantity of iterations may be 20000. Finally, the trained region segmentation network model may be obtained, and segmentation may be performed on the tissue regions of the plurality of tissue types by using the region segmentation network model.

403. The network device selects, from the tissue regions of the plurality of tissue types based on types of capturing positions of the mammographic image, the reserved region that needs to be reserved.

During actual application, referring to FIG. 9, for example, the reserved regions that need to be reserved are in the mammographic image for the different types of capturing positions, and the regions that need to be reserved are different for the tissue regions of the plurality of tissue types. The types of capturing positions include the CC position and the MLO position, and the tissue regions of the plurality of tissue types include the tissue regions of the muscle tissue type and the breast tissue type. When the mammographic image is at the CC position, only the tissue region of the breast tissue type is reserved, and when the mammographic image is at the MLO position, the tissue regions of the muscle tissue type and the breast tissue type are reserved.

Specifically, the network device may obtain a mapping relationship set, and the reserved regions that need to be reserved are selected from the tissue regions of the plurality of tissue types according to a mapping relationship. For example, when the mammographic image is at the CC position, the tissue region of the breast tissue type is correspondingly reserved, and when the mammographic image is at the MLO position, the tissue regions of the muscle tissue type and the breast tissue type are correspondingly reserved. The reserved region that needs to be reserved is selected from the tissue regions of the plurality of tissue types according to the mapping relationship.

404. The network device segments the plurality of candidate recognition regions from the mammographic image.

During actual application, referring to FIG. 9, a breast image may be extracted from the mammographic image, and a plurality of candidate recognition regions are segmented from the breast image.

Specifically, the network device may perform grayscale stretching on the mammographic image, to obtain a stretched mammographic image. After an initial breast image is extracted from the stretched mammographic image, histogram equalization is performed on an image histogram of the initial breast image, to obtain an equalized breast image, and the equalized breast image is filtered, to obtain the breast image. A grayscale range of the mammographic image is stretched to 0 to 255 through linear stretching, and the mammographic image is stretched through the grayscale stretching, so that the robustness of subsequent processing can be improved. A morphological opening operation may then corrode first and then expand the stretched mammographic image, to remove fine tissue and noise in the image, objects at slender points are separated, and an area of the image is not obviously changed at a boundary of a smooth and relatively large object. An Ostu's method is adopted to perform segmentation, that is, the grayscale image is converted into a binary image. The breast image may be obtained by using the morphological opening operation and the Ostu's method. An image histogram corresponding to the breast image may be obtained, and the histogram equalization is then performed, to obtain the equalized breast image. Finally, a filtering operation is performed on the breast image by using bilateral filtering, to obtain the breast image.

During actual application, the breast image may be segmented based on the genetic inheritance algorithm, to obtain a plurality of segmented images, the morphological opening operation is performed on the segmented images, to obtain operated segmented images, and the plurality of candidate recognition regions are selected from the plurality of operated segmented images.

Specifically, the 2D-wavelet transform may be performed on the breast image first to reduce dimensions. For segmentation of the image histogram, the genetic inheritance algorithm may be used, and mapping, in a form of binary coding, from a phenotype to a gene is implemented. A length of the binary coding sequence may be a quantity of image grayscales, so that when a value of a bit is 0, it indicates that the grayscale is a segmentation threshold. A value function of the genetic inheritance algorithm is a method for measuring a level of excellence of the chromosomes. The value function takes a maximum inter-class variance and a minimum intra-class variance as a standard. After population initialization, three processes of iterative selection, crossover, and aberration are repeated until convergence is achieved. For example, a quantity of the initial populations may be 30, a quantity of iterations may be 40, a selectivity may be 10%, a crossover rate may be 80%, and an aberration rate may be 10%. Finally, a segmentation threshold is outputted, and the segmentation is performed on the sub-image according to the segmentation threshold, to obtain the plurality of segmented images.

The morphological opening operation may then be performed on the segmented images, to obtain operated segmented images. Finally, the plurality of candidate recognition regions are selected from the plurality of operated segmented images. For example, regions with a relatively high grayscale may be selected from the plurality of operated segmented images. For example, a region with top five grayscale may be extracted from the plurality of operated segmented images, and based on the extracted region, 10 regions with relatively large areas are selected from each mammographic image as the candidate recognition regions.

405. The network device classifies the candidate recognition regions based on a region classification network model, to obtain, for each of the candidate recognition regions, a corresponding lesion prediction probability.

During actual application, referring to FIG. 9, the network device may perform convolution processing on the candidate recognition regions based on the convolutional layer, to obtain features of the region, and then classify the features of the region based on the fully-connected layer, to obtain the lesion prediction probability corresponding to the candidate recognition regions.

Specifically, when the region classification network model is the Inception V3 network model, the candidate recognition region is inputted into the network model, and the convolution processing is performed through the convolutional layer, to obtain the features of the region, and the features of the region are then classified through the fully-connected layer, to obtain the lesion prediction probability corresponding to the candidate recognition regions. For example, when the region classification network model is the Inception V3 network model, through the convolution kernels with various sizes, the neural network undergoing a depth of 22 layers enables the network model to keep sparsity of a network and use high computing performance of a dense matrix.

In an embodiment, the medical image region screening method may further include a training process of the region classification network model.

During actual application, the positive and negative sample regions may be obtained, the data enhancement is then performed on the positive and negative sample regions, to obtain the enhanced positive and negative sample regions, and the model weight in the region classification network model is then updated according to the enhanced positive and negative sample regions, to obtain the trained region classification network model, and finally, the region classification network model is updated based on the trained region classification network model.

Specifically, there are a plurality of manners of obtaining the positive and negative sample regions. For example, experts may be hired to mark the data by using hospital data, and the positive and negative sample regions may be downloaded locally or from the Internet, and the like. The data enhancement is then performed on the positive and negative sample regions, to obtain the enhanced positive and negative sample regions. For example, because the image in which the positive and negative sample regions are located is the mammographic image, data enhancement of flipping and cropping on the positive and negative sample regions is mainly performed, while data enhancement of color space is not required, so that a plurality of enhanced positive and negative sample regions are obtained.

When the region classification network model is the Inception V3 network model, a quantity of output categories of the model may be set to 2. An ImageNet dataset (computer vision standard dataset) may be first used during weight initialization of the model, and the public dataset DDSM is then used. The public dataset DDSM is a database established by a medical institution in the United States to store breast cancer images. Finally, the enhanced positive and negative sample regions are used for transfer learning to update the model weight in the region classification network model. For example, RMSprop (an adaptive learning rate method based on a root mean square) may be used as a descent algorithm, a size of batch processing may be 64, an initial learning rate is 0.01, and a maximum quantity of iterations is 100000. After training is completed, the trained region classification network model is obtained. The region classification network model is then updated based on the trained region classification network model, to obtain the region classification network model.

406. The network device selects a predicted lesion region from the candidate recognition regions based on the lesion prediction probability.

During actual application, referring to FIG. 9, the network device may select the predicted lesion region from the candidate recognition regions based on the lesion prediction probability. For example, the candidate recognition region with a lesion prediction probability greater than 0.5 may be determined as the predicted lesion region.

In an embodiment, an overlapping region of the predicted lesion region may be removed by using a non-maximum suppression method, and an overlapping degree threshold may be set to 50%, so that a false alarm rate can be reduced, and accuracy of positioning a predicted lesion region can be improved.

407. The network device obtains a positional relationship between the reserved region and the predicted lesion region in the mammographic image.

There may be a plurality of manners of obtaining the positional relationship. For example, image overlapping may be performed on the reserved region and the medical image including the predicted lesion region in a manner of image overlapping, to obtain the positional relationship. For example, an anchor point position of the reserved region may be determined in the medical image including the predicted lesion region (for example, two vertices on a diagonal line of the reserved region may be determined as the anchor points of the reserved region), and the image overlapping is performed on the reserved region and the medical image including the predicted lesion region, thereby obtaining the positional relationship between the reserved region and the predicted lesion region.

In an embodiment, for example, coordinate information of the reserved region and the predicted lesion region may further be obtained to obtain the positional relationship between the reserved region and the predicted lesion region. For example, the coordinate information of the reserved region may be compared with the coordinate information of the predicted lesion region to obtain position information of the predicted lesion region in the reserved region.

408. The network device screens the predicted lesion region in the mammographic image based on the positional relationship, to obtain the target lesion region.

In an embodiment, the reserved region and the predicted lesion region are both obtained based on the detection of the same target position medical image. Therefore, the positional relationship between the reserved region and the predicted lesion region in the medical image may be obtained, and the predicted lesion region is screened in the reserved region, to obtain the target lesion region, thereby improving accuracy of medical image region screening.

During actual application, the predicted lesion region in the medical image is screened based on the positional relationship, to obtain the target lesion region. For example, when the reserved region includes the tissue region of the muscle tissue type and the tissue region of the breast tissue type, the positional relationship between the reserved region and the predicted lesion region may be obtained, and according to the positional relationship, the predicted lesion region falling into the muscle region and the nipple region that are in the reserved region is screened out, or otherwise, the predicted lesion region is recognized as the target lesion region.

Figure 6:
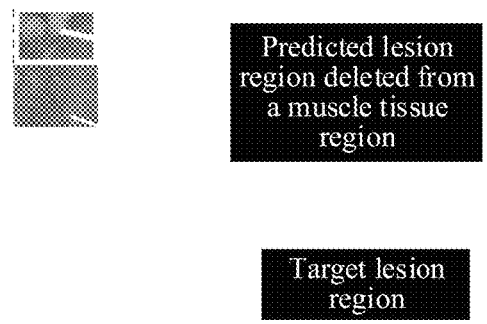
FIG. 6 is a schematic diagram of lesion region screening according to an embodiment of the present disclosure.
Figure 7:
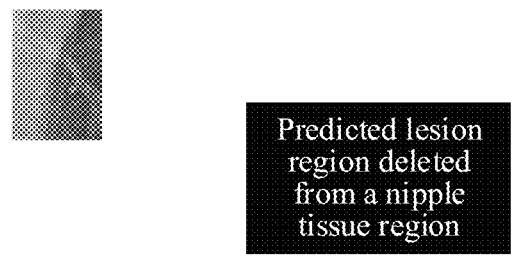
FIG. 7 is another schematic diagram of lesion region screening according to an embodiment of the present disclosure.
Figure 8:
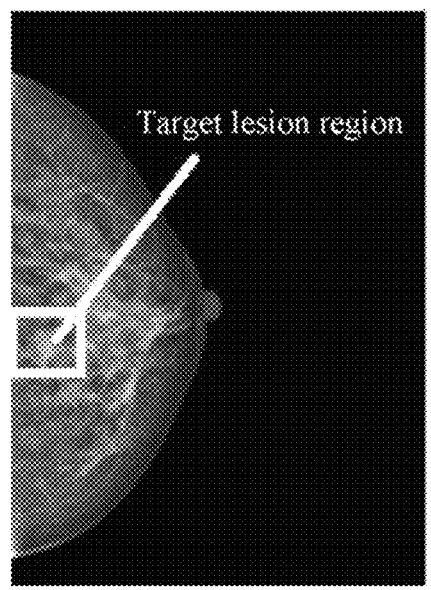
FIG. 8 is yet another schematic diagram of lesion region screening according to an embodiment of the present disclosure.

During actual application, referring to FIG. 6, FIG. 7, and FIG. 8, FIG. 6 and FIG. 7 are images captured at the MLO position, and FIG. 8 is an image captured at the CC position. A lesion region corresponding to the mammographic image included in a specific region in the reserved region is screened, to obtain a target lesion region. For example, for the muscle region and the nipple region in the reserved region, when the predicted lesion region falls entirely within the muscle region (as shown in FIG. 6) or includes the nipple region (as shown in FIG. 7) in the reserved region, the predicted lesion region is screened out, or otherwise, the predicted lesion region is recognized as the target lesion region (as shown in FIG. 6 and FIG. 8).

It may be learned from above that, in the embodiments of the present disclosure, the medical image of the biological tissue is obtained by using the network device, the tissue regions of the plurality of tissue types are selected from the medical image, the reserved region that needs to be reserved is selected from the tissue regions of the plurality of tissue types based on the types of capturing positions of the medical image, the positional relationship between the reserved region and the predicted lesion region in the medical image is obtained, and the predicted lesion region in the medical image is screened based on the positional relationship, to obtain the target lesion region. In the solution, diverse features of the image are extracted by using two neural networks connected in parallel, thereby reducing manual workload and improving automation degree, accuracy, efficiency, and application promotion. Based on the capturing position type of the medical image, a region that needs to be reserved is selected from the tissue regions of the plurality of tissue types, and based on the reserved region, the predicted lesion region corresponding to the medical image is screened, so that the lymph nodes and nipples that interfere with determination of the target lesion region can be effectively screened out, and the misjudgment of a target lesion region is reduced, thereby improving the accuracy of region screening.

Figure 10:
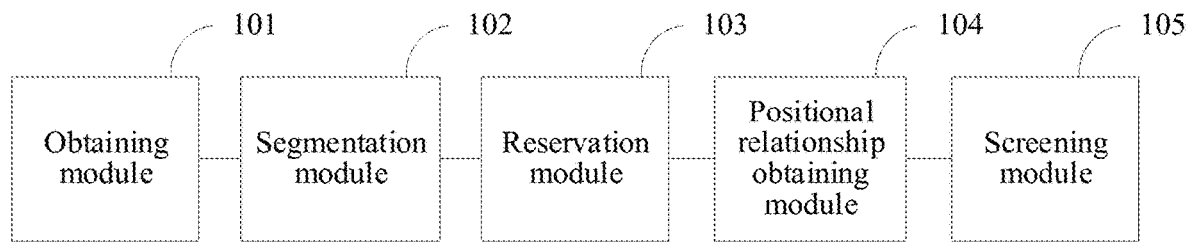
FIG. 10 is a schematic structural diagram of a medical image region screening apparatus according to an embodiment of the present disclosure.

To better implement the foregoing method, the embodiments of the present disclosure further provide a medical image region screening apparatus, and the medical image region screening apparatus may be applied to the network device. As shown in FIG. 10, the medical image region screening apparatus may include: an obtaining module 101, a segmentation module 102, a reservation module 103, a positional relationship obtaining module 104, and a screening module 105.

The obtaining module 101 is configured to obtain a medical image of a target part of biological tissue.

The segmentation module 102 is configured to segment tissue regions of a plurality of tissue types from the medical image.

The reservation module 103 is configured to select, from the tissue regions of the plurality of tissue types based on types of capturing positions of the medical image, a reserved region that needs to be reserved.

The positional relationship obtaining module 104 is configured to obtain a positional relationship between the reserved region and a predicted lesion region in the medical image.

The screening module 105 is configured to screen the predicted lesion region in the medical image based on the positional relationship, to obtain a target lesion region.

In an embodiment, the segmentation module 102 may be specifically configured to:
perform convolution processing on the medical image based on the convolutional subnetwork, to obtain a feature of the image;
perform up-sampling on the feature based on the deconvolutional subnetwork, to obtain a feature image with a restored dimension; and
classify the feature image with the restored dimension, to obtain the tissue regions of the plurality of tissue types.

Figure 11:
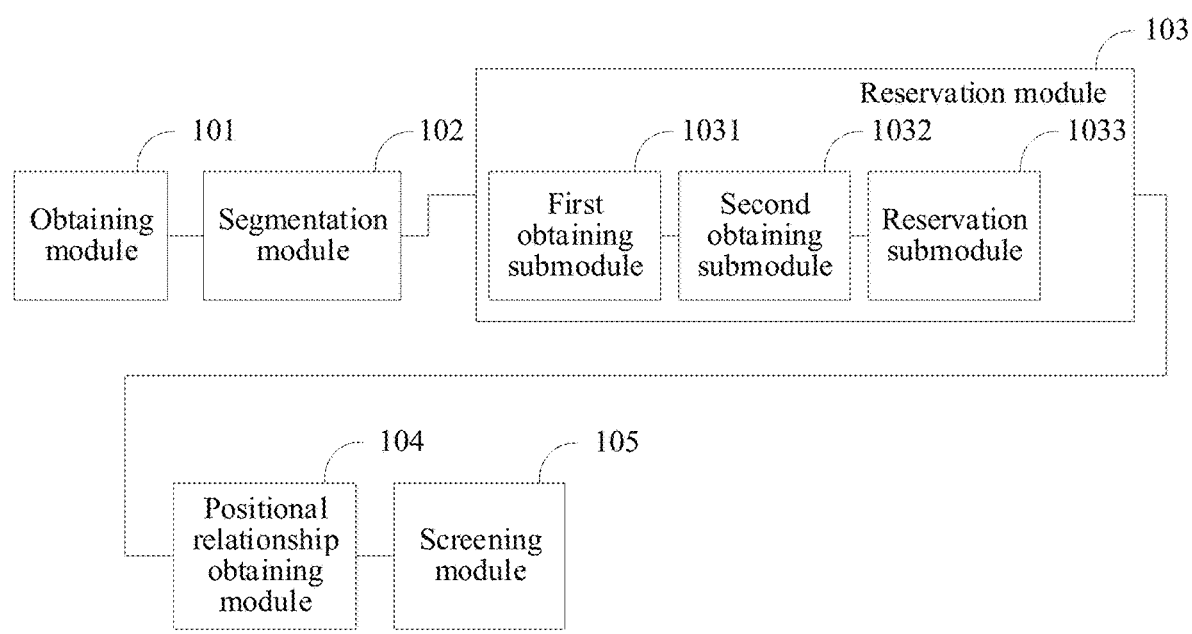
FIG. 11 is another schematic structural diagram of a medical image region screening apparatus according to an embodiment of the present disclosure.

In an embodiment, referring to FIG. 11, the reservation module 103 may include a first obtaining submodule 1031, a second obtaining submodule 1032, and a reservation submodule 1033.

The first obtaining submodule 1031 is configured to obtain a mapping relationship set, the mapping relationship set including a mapping relationship between a preset capturing position type of the medical image and a tissue type.

The second obtaining submodule 1032 is configured to obtain a tissue type corresponding to a capturing position type according to the mapping relationship.

The reservation submodule 1033 is configured to select, from tissue regions of a plurality of tissue types, a reserved region that needs to be reserved.

Figure 12:
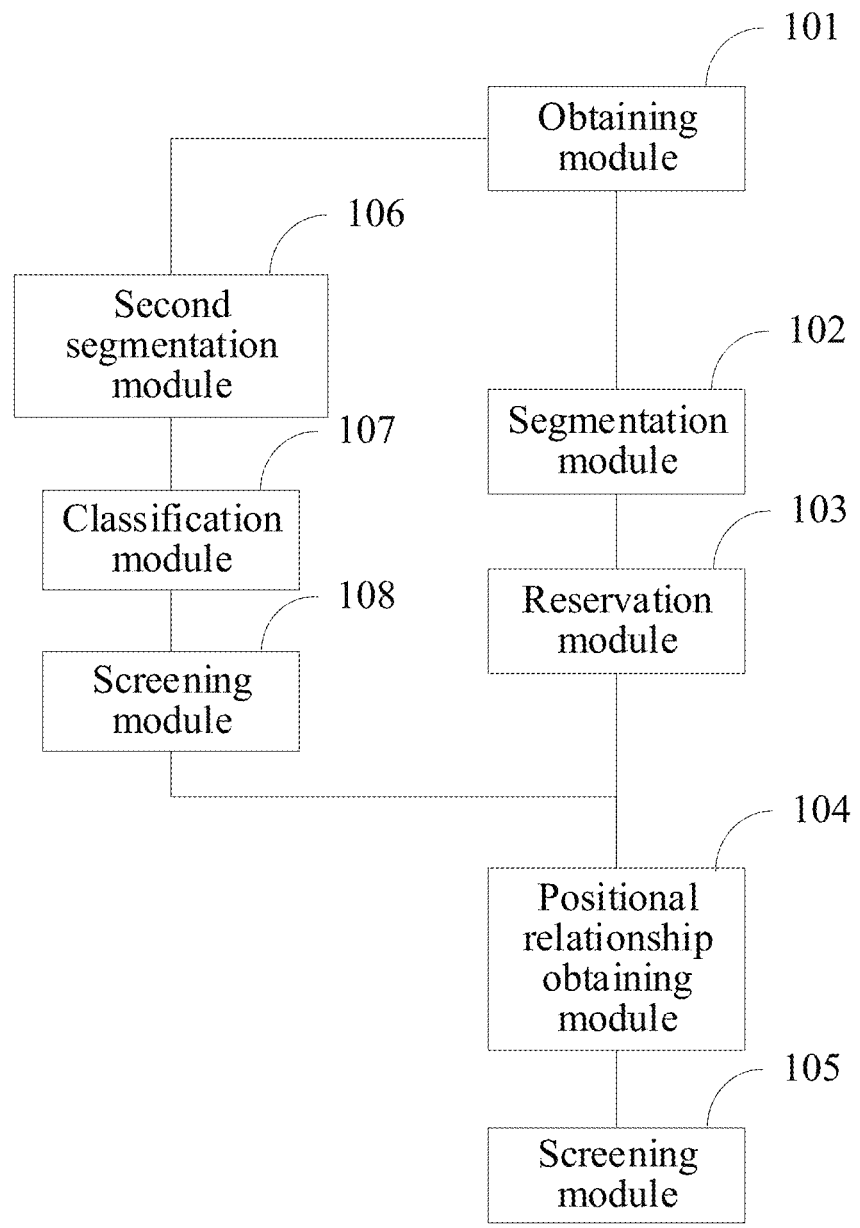
FIG. 12 is yet another schematic structural diagram of a medical image region screening apparatus according to an embodiment of the present disclosure.

In an embodiment, referring to FIG. 12, the medical image region screening apparatus may further include a second segmentation module 106, a classification module 107, and a screening module 108.

The second segmentation module 106 is configured to segment a plurality of candidate recognition regions from the medical image.

The classification module 107 is configured to classify the candidate recognition regions based on a region classification network model, to obtain a lesion prediction probability corresponding to the candidate recognition regions.

The screening module 108 is configured to select a predicted lesion region from the candidate recognition regions based on the lesion prediction probability, to obtain a predicted lesion region corresponding to the medical image.

In an embodiment, the second segmentation module 106 may be specifically configured to:
extract a sub-image from the medical image; and
segment the plurality of candidate recognition regions from the sub-image.

In an embodiment, the classification module 107 may be specifically configured to:
perform convolution processing on the candidate recognition regions based on the convolutional layer, to obtain features of the region; and
classify the features of the region based on the fully-connected layer, to obtain the lesion prediction probability corresponding to the candidate recognition regions.

It may be learned from above that, in the embodiments of the present disclosure, the medical image of the biological tissue is obtained by using the obtaining module 101, the tissue regions of the plurality of tissue types are selected from the medical image by using the segmentation module 102, the reserved region that needs to be reserved is selected from the tissue regions of the plurality of tissue types based on the types of capturing positions of the medical image by using the reservation module 103, the positional relationship between the reserved region and the predicted lesion region in the medical image is obtained by using the positional relationship obtaining module 104, and the predicted lesion region in the medical image is screened based on the positional relationship by using the screening module 105, to obtain the target lesion region. In the solution, diverse features of the image are extracted by using two neural networks connected in parallel, thereby reducing manual workload and improving automation degree, accuracy, efficiency, and application promotion. Based on the capturing position type of the medical image, a region that needs to be reserved is selected from the tissue regions of the plurality of tissue types, and based on the reserved region, the predicted lesion region corresponding to the medical image is screened, so that the lymph nodes and nipples that interfere with determination of the target lesion region can be effectively screened out, and the misjudgment of a target lesion region is reduced, thereby improving the accuracy of region screening.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 13:
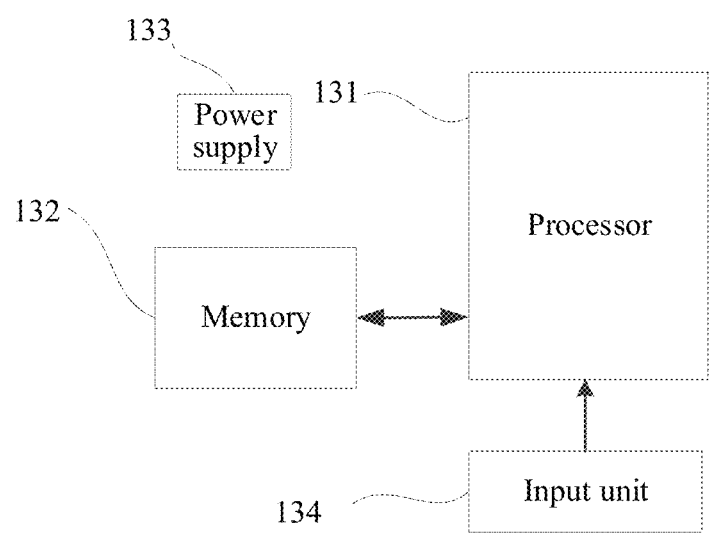
FIG. 13 is a schematic structural diagram of a network device according to an embodiment of the present disclosure.

The embodiments of the present disclosure further provide a network device. The network device may be a device such as server or a terminal, and integrates any medical image region screening apparatus provided in the embodiments of the present disclosure. FIG. 13 is a schematic structural diagram of a network device according to an embodiment of the present disclosure. Specifically:

The network device may include components such as a processor 131 including one or more processing cores, a memory 132 including one or more computer-readable storage media, a power supply 133, and an input unit 134. The structure of the network device shown in FIG. 13 does not constitute a limitation to the network device, and the network device may include more or fewer components than those shown in the figure, or some components may be combined, or a different component deployment may be used.

The processor 131 is the control center of the network device, connects all parts of the entire network device by using various interfaces and lines, and executes various functions and processing data of the network device by running or executing software programs and/or modules stored in the memory 132, and calling data stored in the memory 132, thereby performing overall monitoring on the network device. In some embodiments, the processor 131 may include one or more processing cores. The processor 131 may integrate an application processor and a modem processor. The application processor mainly processes an operating system, a user interface, an application program, and the like, and the modem processor mainly processes wireless communication. It may be understood that alternatively, the modem processor may not be integrated into the processor 131.

The memory 132 may be configured to store a software program and a module, and the processor 131 runs the software program and the module that are stored in the memory 132, to implement various functional applications and data processing. The memory 132 may mainly include a program storage area and a data storage area. The program storage area may store an operating system, an application program required by at least one function (such as a sound playing function and an image display function), and the like. The data storage area may store data created according to use of the network device, and the like. In addition, the memory 132 may include a high speed random access memory, and may further include a non-volatile memory, such as at least one magnetic disk storage device, a flash storage device or other non-volatile solid state storage devices. Correspondingly, the memory 132 may further include a memory controller, so that the processor 131 can access the memory 132.

The network device further includes the power supply 133 for supplying power to the components. The power supply 133 may be logically connected to the processor 131 by using a power management system, thereby implementing functions such as charging, discharging, and power consumption management by using the power management system. The power supply 133 may further include one or more direct current or alternating current power supplies, a re-charging system, a power failure detection circuit, a power supply converter or inverter, a power supply state indicator, and any other component.

The network device may further include the input unit 134. The input unit 134 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in one embodiment, the processor 131 in the network device may load executable files corresponding to processes of one or more applications to the memory 132 according to the following instructions, and the processor 131 runs an application stored in the memory 132, to implement various functions as follows:

obtaining the medical image of the biological tissue, segmenting the tissue regions of the plurality of tissue types from the medical image, selecting, from the tissue regions of the plurality of tissue types based on the types of capturing positions of the medical image, the reserved region that needs to be reserved, obtaining the positional relationship between the reserved region and the predicted lesion region in the medical image, and screening the predicted lesion region in the medical image based on the positional relationship, to obtain a target lesion region.

The processor 131 may further run the application stored in the memory 132, to implement various functions as follows:

obtaining the medical image of the biological tissue, segmenting the tissue regions of the plurality of tissue types from the medical image, selecting, from the tissue regions of the plurality of tissue types based on the types of capturing positions of the medical image, the reserved region that needs to be reserved, obtaining the positional relationship between the reserved region and the predicted lesion region in the medical image, and screening the predicted lesion region in the medical image based on the positional relationship, to obtain a target lesion region.

For specific implementations of the above operations, refer to the foregoing embodiments. Details are not described herein again.

It may be learned from above that, in the embodiments of the present disclosure, the medical image of the biological tissue is obtained, the tissue regions of the plurality of tissue types are selected from the medical image, the reserved region that needs to be reserved is selected from the tissue regions of the plurality of tissue types based on the types of capturing positions of the medical image, the positional relationship between the reserved region and the predicted lesion region in the medical image is obtained, and the predicted lesion region in the medical image is screened based on the positional relationship, to obtain the target lesion region. In the solution, diverse features of the image are extracted by using two neural networks connected in parallel, thereby reducing manual workload and improving automation degree, accuracy, efficiency, and application promotion. Based on the capturing position type of the medical image, a region that needs to be reserved is selected from the tissue regions of the plurality of tissue types, and based on the reserved region, the predicted lesion region corresponding to the medical image is screened, so that the lymph nodes and nipples that interfere with determination of the target lesion region can be effectively screened out, and the misjudgment of a target lesion region is reduced, thereby improving the accuracy of region screening.

All or some steps of the methods of the foregoing embodiments may be implemented through instructions, or may be implemented through instructions controlling relevant hardware, and the instructions may be stored in a computer-readable storage medium, and may be loaded and executed by a processor.

Accordingly, the embodiments of the present disclosure provide a storage medium, storing a plurality of instructions. The instructions can be loaded by the processor, to perform the steps in any medical image region screening method according to the embodiments of the present disclosure. For example, the instructions may perform the following steps:

obtaining the medical image of the biological tissue, segmenting the tissue regions of the plurality of tissue types from the medical image, selecting, from the tissue regions of the plurality of tissue types based on the types of capturing positions of the medical image, the reserved region that needs to be reserved, obtaining the positional relationship between the reserved region and the predicted lesion region in the medical image, and screening the predicted lesion region in the medical image based on the positional relationship, to obtain a target lesion region.

For specific implementations of the above operations, refer to the foregoing embodiments. Details are not described herein again.

The storage medium may include: a read-only memory (ROM), a random access memory (RAM), a magnetic disk, an optical disc, or the like.

Because the instructions stored in the storage medium may perform the steps of any medical image region screening method provided in the embodiments of the present disclosure, the instructions can implement beneficial effects that can be implemented by any medical image region screening method provided in the embodiments of the present disclosure. For details, reference may be made to the foregoing embodiments. Details are not described herein again.

The medical image region screening method and apparatus and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. A medical image region screening method, comprising:
   obtaining a medical image of biological tissue;
   segmenting tissue regions of a plurality of tissue types from the medical image;
   selecting, from the tissue regions of the plurality of tissue types based on types of capturing positions of the medical image, a reserved region, comprising:
      obtaining a mapping relationship set, each mapping relationship in the mapping relationship set indicating a correspondence between a preset capturing position type of the medical image and a tissue type;
      obtaining a tissue type corresponding to a capturing position type according to a mapping relationship in the mapping relationship set; and
      selecting, from the tissue regions of the plurality of tissue types, the reserved region;
   obtaining a positional relationship between the reserved region and a predicted lesion region in the medical image; and
   screening the predicted lesion region in the medical image based on the positional relationship, to obtain a target lesion region.

2. The medical image region screening method according to claim 1, wherein the segmenting tissue regions of a plurality of tissue types from the medical image comprises:
   segmenting the tissue regions of the plurality of tissue types from the medical image based on a region segmentation network model, wherein the region segmentation network model is trained by using a plurality of sample medical images.

3. The medical image region screening method according to claim 2, wherein the region segmentation network model comprises a convolutional subnetwork and a deconvolutional subnetwork; and
   the segmenting the tissue regions of the plurality of tissue types from the medical image based on a region segmentation network model comprises:
   performing convolution processing on the medical image based on the convolutional subnetwork, to obtain a feature of the medical image;
   performing up-sampling on the feature based on the deconvolutional subnetwork, to obtain a feature image with a restored dimension; and
   classifying the feature image with the restored dimension, to obtain the tissue regions of the plurality of tissue types.

4. The medical image region screening method according to claim 1, further comprising:
   segmenting a plurality of candidate recognition regions from the medical image;
   classifying the candidate recognition regions based on a region classification network model, to obtain, for each of the candidate recognition regions, a corresponding lesion prediction probability; and
   selecting a predicted lesion region from the candidate recognition regions based on the lesion prediction probability, to obtain a predicted lesion region corresponding to the medical image.

5. The medical image region screening method according to claim 4, wherein the segmenting a plurality of candidate recognition regions from the medical image comprises:
   extracting a sub-image from the medical image; and
   segmenting the plurality of candidate recognition regions from the sub-image.

6. The medical image region screening method according to claim 4, wherein the region classification network model comprises a convolutional layer and a fully-connected layer; and
   the classifying the candidate recognition regions based on a region classification network model, to obtain, for each of the candidate recognition regions, a lesion prediction probability comprises:
   performing convolution processing on the candidate recognition regions based on the convolutional layer, to obtain features of the region; and
   classifying the features of the region based on the fully-connected layer, to obtain the lesion prediction probability corresponding to the candidate recognition regions.

7. The medical image region screening method according to claim 1, further comprising:
   obtaining positive sample regions and negative sample regions, each positive sample region comprising a predicted lesion region;
   performing data enhancement on the positive and negative sample regions, to obtain the enhanced positive and negative sample regions;
   updating a model weight in the region classification network model according to the enhanced positive and negative sample regions, to obtain a trained region classification network model; and
   updating the region classification network model based on the trained region classification network model.

8. A medical image region screening device comprises a processor and a memory,
   the memory being configured to store medical image data and a plurality of computer instructions; and the processor being configured to read the plurality of computer instructions stored in the memory to perform a plurality of operations comprising:

obtaining a medical image of biological tissue;

segmenting tissue regions of a plurality of tissue types from the medical image;

selecting, from the tissue regions of the plurality of tissue types based on types of capturing positions of the medical image, a reserved region, comprising:

obtaining a mapping relationship set, each mapping relationship in the mapping relationship set indicating a correspondence between a preset capturing position type of the medical image and a tissue type;

obtaining a tissue type corresponding to a capturing position type according to a mapping relationship in the mapping relationship set; and selecting, from the tissue regions of the plurality of tissue types, the reserved region;

obtaining a positional relationship between the reserved region and a predicted lesion region in the medical image; and screening the predicted lesion region in the medical image based on the positional relationship, to obtain a target lesion region.

9. The medical image region screening device according to claim 8, wherein the operation of segmenting tissue regions of a plurality of tissue types from the medical image comprises:

segmenting the tissue regions of the plurality of tissue types from the medical image based on a region segmentation network model, wherein the region segmentation network model is trained by using a plurality of sample medical images.

10. The medical image region screening device according to claim 9, wherein the region segmentation network model comprises a convolutional subnetwork and a deconvolutional subnetwork, and the operation of segmenting the tissue regions of the plurality of tissue types from the medical image based on a region segmentation network model comprises:

performing convolution processing on the medical image based on the convolutional subnetwork, to obtain a feature of the image;

performing up-sampling on the feature based on the deconvolutional subnetwork, to obtain a feature image with a restored dimension; and classifying the feature image with the restored dimension, to obtain the tissue regions of the plurality of tissue types.

11. The medical image region screening device according to claim 8, wherein the plurality of operations further comprises:

segmenting a plurality of candidate recognition regions from the medical image;

classifying the candidate recognition regions based on a region classification network model, to obtain, for each of the candidate recognition regions, a corresponding lesion prediction probability; and selecting a predicted lesion region from the candidate recognition regions based on the lesion prediction probability, to obtain a predicted lesion region corresponding to the medical image.

12. The medical image region screening device according to claim 11, wherein the operation of segmenting a plurality of candidate recognition regions from the medical image comprises:

extracting a sub-image from the medical image; and segmenting the plurality of candidate recognition regions from the sub-image.

13. The medical image region screening device according to claim 11, wherein the region classification network model comprises a convolutional layer and a fully-connected layer; and the operation of classifying the candidate recognition regions based on a region classification network model, to obtain, for each of the candidate recognition regions, a lesion prediction probability comprises:

performing convolution processing on the candidate recognition regions based on the convolutional layer, to obtain features of the region; and classifying the features of the region based on the fully-connected layer, to obtain the lesion prediction probability corresponding to the candidate recognition regions.

14. The medical image region screening device according to claim 8, wherein the plurality of operations further comprises:

obtaining positive sample regions and negative sample regions, each positive sample region comprising a predicted lesion region;

performing data enhancement on the positive and negative sample regions, to obtain the enhanced positive and negative sample regions;

updating a model weight in the region classification network model according to the enhanced positive and negative sample regions, to obtain a trained region classification network model; and updating the region classification network model based on the trained region classification network model.

15. A non-transitory storage medium, storing computer instructions, the computer instructions, when executed by a processor, cause the processor to perform a plurality of operations comprising:

obtaining a medical image of biological tissue;

segmenting tissue regions of a plurality of tissue types from the medical image;

selecting, from the tissue regions of the plurality of tissue types based on types of capturing positions of the medical image, a reserved region, comprising:

obtaining a mapping relationship set, each mapping relationship in the mapping relationship set indicating a correspondence between a preset capturing position type of the medical image and a tissue type;

obtaining a tissue type corresponding to a capturing position type according to a mapping relationship in the mapping relationship set; and selecting, from the tissue regions of the plurality of tissue types, the reserved region;

obtaining a positional relationship between the reserved region and a predicted lesion region in the medical image; and screening the predicted lesion region in the medical image based on the positional relationship, to obtain a target lesion region.

16. The storage medium according to claim 15, wherein the segmenting tissue regions of a plurality of tissue types from the medical image comprises:

segmenting the tissue regions of the plurality of tissue types from the medical image based on a region segmentation network model, wherein the region segmentation network model is trained by using a plurality of sample medical images.

17. The storage medium according to claim 16, wherein the region segmentation network model comprises a convolutional subnetwork and a deconvolutional subnetwork; and the segmenting the tissue regions of the plurality of tissue types from the medical image based on a region segmentation network model comprises:

performing convolution processing on the medical image based on the convolutional subnetwork, to obtain a feature of the medical image;

performing up-sampling on the feature based on the deconvolutional subnetwork, to obtain a feature image with a restored dimension; and classifying the feature image with the restored dimension, to obtain the tissue regions of the plurality of tissue types.

* * * * *